United States Patent [19]

Brunelle

[11] Patent Number: 5,999,194

[45] Date of Patent: *Dec. 7, 1999

[54] TEXTURE CONTROLLED AND COLOR SYNTHESIZED ANIMATION PROCESS

[76] Inventor: Theodore M. Brunelle, Road#1, Box 102M, New Milford, Pa. 18834

[*] Notice: This patent issued on a continued prosecution application filed under 37 CFR 1.53(d), and is subject to the twenty year patent term provisions of 35 U.S.C. 154(a)(2).

[21] Appl. No.: 08/749,218

[22] Filed: Nov. 14, 1996

[51] Int. Cl.⁶ .................................................. G06T 17/00
[52] U.S. Cl. .......................................... 345/473; 345/470
[58] Field of Search ............................ 345/44, 421, 431, 345/419, 473, 474, 475, 430

[56] References Cited

U.S. PATENT DOCUMENTS

| | | |
|---|---|---|
| 1,107,193 | 8/1914 | Bray . |
| 1,143,542 | 6/1915 | Hurd . |
| 1,715,127 | 5/1929 | Goldman . |
| 3,510,210 | 5/1970 | Haney ........................................ 352/39 |
| 4,346,403 | 8/1982 | Tamura ...................................... 358/93 |
| 4,600,919 | 7/1986 | Stern ......................................... 340/725 |
| 4,797,836 | 1/1989 | Witek et al. ............................... 364/518 |
| 4,952,051 | 8/1990 | Lovell et al. .............................. 352/87 |
| 4,956,872 | 9/1990 | Kimura ...................................... 382/44 |
| 4,958,297 | 9/1990 | Hansen ...................................... 364/518 |
| 5,007,005 | 4/1991 | Hatakeyama et al. ................... 364/521 |
| 5,025,394 | 6/1991 | Parke ........................................ 364/518 |
| 5,038,223 | 8/1991 | Yamada .................................... 358/445 |
| 5,113,493 | 5/1992 | Crosby ...................................... 395/152 |
| 5,175,806 | 12/1992 | Muscovitz et al. ...................... 395/125 |
| 5,175,808 | 12/1992 | Sayre ........................................ 395/133 |
| 5,198,902 | 3/1993 | Richards et al. ......................... 358/183 |
| 5,204,944 | 4/1993 | Wolberg et al. .......................... 395/127 |
| 5,214,718 | 5/1993 | Khosla ...................................... 382/22 |
| 5,214,758 | 5/1993 | Ohba et al. ............................... 395/164 |
| 5,261,041 | 11/1993 | Susman .................................... 395/152 |
| 5,317,685 | 5/1994 | Morimura et al. ....................... 395/152 |
| 5,325,473 | 6/1994 | Monroe et al. ........................... 395/129 |
| 5,325,480 | 6/1994 | Rice ......................................... 395/152 |
| 5,416,848 | 5/1995 | Young ....................................... 382/191 |
| 5,420,940 | 5/1995 | Sedlar et al. ............................. 382/276 |
| 5,459,830 | 10/1995 | Ohba et al. ............................... 395/152 |
| 5,473,739 | 12/1995 | Hsu .......................................... 395/134 |

FOREIGN PATENT DOCUMENTS

| | | |
|---|---|---|
| 0457546 | 5/1991 | European Pat. Off. . |
| WO8605610 | 9/1986 | WIPO . |

OTHER PUBLICATIONS

Anderson et al., "Computer Animation", Visual Communication Books, pp. 1–3.

Lee et al., Image Morphing Using Deformable Surfaces, Sep. 1994 IEEE, pp. 31–38.

Sanchez et al., "Computer Animation–Programming Methods and Techniques", 1995, McGraw Hill, pp. 12–19, 361–365,.

Thalman et al., Computer Animation '90", 1990, pp. 80–91.

Thalman et al., Computer Animation—Theory and Practice, 1985, pp. 13–17.

*Primary Examiner*—Phu K. Nguyen
*Assistant Examiner*—Cliff N. Vo
*Attorney, Agent, or Firm*—Sofer & Haroun, LLP

[57] ABSTRACT

An animation producing process for producing an animation having fluid color, texture and consistency throughout the entire sequence. The process comprises the steps of creating key frames containing objects and characters having substantial color and texture and which correspond to an animated sequence. The key frames are digitized into a computer system for storage in a predetermined memory space. Two consecutive key frames are then defined as a source key frame and a target key frame. Corresponding features in both the source key frame and the target key frame are then outlined, preferably while projected upon a computer monitor. In-between frames are then generated that depict a substantially linear interpolation of each outlined figure in the source key frame and a corresponding outline in the target key frame.

15 Claims, 6 Drawing Sheets

TEXTURE CONTROLLED AND COLOR SYNTHESIZED ANIMATION PROCESS

FIELD OF THE INVENTION

This invention relates to animation, and in particular, to a process of producing an animated sequence having fluid color, texture and consistency throughout the entire sequence.

BACKGROUND OF THE INVENTION

The art of animation is the rapid succession of a series of drawings, each showing a stage of movement slightly changed from the one before, to create the illusion of motion. Many methods for generating animated drawings and for producing animated sequences using computer hardware and software are known. Many of these methods have been considerably successful. Few of these methods, however, are capable of producing animated sequences in which the scenes comprising the sequences are fluid and precise, and which include even shading and blending of colors and textures.

The current practice of producing animation which utilizes paper, paint, ink, acetate or "cel" sheets, and film is a laborious task which has been illustrated in a series of U.S. patents dating back to the early 1900's. U.S. Pat. No. 1,107,193 (1914) to Bray, first introduced the notion of separating still or background elements from moving elements and figures. This permitted still elements to be drawn only once. U.S. Pat. No. 1,143,542 (1915) to Hurd, introduced a more practical method for doing this, and U.S. Pat. No. 1,715,127 (1929), taught an improved method of registering sheets of cel material.

Traditionally, animation is created using hand drawings and photographic equipment to record the hand drawings in a sequence to depict motion. This procedure first involves pose planning by an artist who then proceeds to draw a series of rough position poses on paper. Next, several key frames of a character are drawn on paper sheets or boards. The key frames, generally a source key and a target key, are intended to indicate the extremes of a range of motion the character is to undergo, or a distance to be traveled, and are generally designated as the main or key positions of the character. Next, these two key frames are placed on a translucent surface with a light or lightboard disposed underneath the translucent surface. An artist, generally referred to in the art field as an in-betweener, arranges the two key frames on the translucent surface so that the lines of both cels are clearly visible. An additional cel is then superimposed over the first two key frames. While viewing the underlying lines of the key frames, the in-betweener traces between the lines of the two key frames to produce an "in-between" frame having lines between the original lines of the key frames. Using the newly drawn in-between frame and the target frame, the process of producing another in-between frame is continuously repeated using the newly created in-between frame and the target key until the required number of frames are reached such that several in-between cels have been produced. The difference between the in-between drawings must be comparatively slight, consistent and of the proper character. When skillfully done, the object in the in-between drawings will appear to move smoothly and naturally when the pictures are displayed rapidly in sequence. Up to this point, the animator is dealing only with outlines having no color or shading.

After all the in-between frames have been produced, all of the frames are checked for smoothness, correctness, and continuity in the animations. A crude, but quick method of checking for continuity is to stack the cels upon each other in sequence and examine them in order by "rolling" them. "Rolling" is performed by firmly holding one edge of the stack of cels and slightly bending the other edge releasing the pages one-by-one in rapid succession. Alternatively, the cels may be viewed by scanning or digitizing the paper cels into a computer system and projecting the cels on the computer monitor at their appropriate rate of 24 or 30 frames per second, depending upon the medium to which they are to be ultimately stored upon. Using either of these methods, corrections are easily made by revising the in-between or creating substitute cels. Since the drawings cannot yet be seen in animation at true speed, oftentimes a "pencil test" is performed. A pencil test involves photographing or videotaping the rough drawings frame by frame, onto film or video tape. After developing the film or tape, the animator is able to judge the drawings and make any required correction. The pencil test is, however, extremely time consuming and often requires additional expensive equipment. As such, the test is done infrequently and often skipped altogether.

When all the drawing are complete, the paper cels are then traced or photocopied on to clear plastic acetate cel, or scanned onto a computer if electronic inking and painting is going to be used. If coloring is performed by hand, each cel is then carefully inked and painted on the reverse side. During painting, the colorist must be extremely careful not to paint outside the lines or to blend any colors. Oftentimes several layers of cels are used in complex animations, and different parts of the animation are painted onto separate cels. Cel paint must, therefore, be mixed to slightly different shades so that colors appear to match when covered with a differing number of layers of cel material. Cel paint must also be carefully matched from batch to batch. Moreover, once painted and cleaned, cels must be reordered and carefully checked prior to photographing. The cost of paints, inks and the skill and time required to paint each of the cels render this step in the animation process extremely expensive. Furthermore, since there are likely to be numerous cels which have all been excessively handled up to this point in the animation process, dust, fingerprints, and smudges may be a major problem. The cells thus require a careful cleaning after painting has been completed.

After all the cels have been painted, checked for accuracy and cleaned, they are photographed one by one and composited or overlaid on a background. This process is extremely tedious and time consuming. Furthermore, it is essential that the color sections be prevented from blending, since it would be impossible to retain a consistency of texturing, shading, and/or blending throughout the multiple cels.

For many years, the application of computers to animation has been part of an attempt to save the animator from making all of the in-between drawings, generating them instead by computational means rather than manually. In most instances, however, the artists skill in drafting the key frames is preferred over computer generated drawings which may often be crude and lack certain texture or "feeling." Computer technology has also introduced numerous software programs for adding special effects to the traditional animation process. In order to provide a desired texture to a character or object, some software programs require the animator to scan into the computer a small photograph of the texture which is desired. Thereafter, every time the animator desires that texture, it must be retrieved from the computer's memory and repeated or "layered" over the character or object until the desire texture is attained. In addition to producing less than acceptable texturing, this procedure is extremely burdensome and time consuming.

In addition to the traditional prior art method of animation, numerous other animation processes have been disclosed, both manual, computer generated and a combination of the two, along with numerous alternative methods for performing individual stages of the traditional animation process as disclosed. For instance, U.S. Pat. No. 4,9452,051 to Lovell et al. describes a method and system for drawing and manipulating cels via computer interface. The process recited for creating frames is similar to the traditional manner yet performed by a computer instead of by hand. The computer creates the bounding lines or character keys of the desired image and permits the animator to create in-between frames via computer computations of any two drawn key frames. Cel position may then be manipulated and color may be added using the computer. However, the resulting animation sequence generated by this process is less than desirable.

Accordingly, there is a need for a simple and time saving animation process which provides animated sequences in which non-segregated colors and shading, full texture, and fluid and concise movements are maintained over the entire animation.

OBJECTS AND SUMMARY OF THE INVENTION

It is thus a general object of the present invention to provide an animation process which integrates traditional animation techniques with computer technology.

A more specific object of the present invention is to provide an animation process which provides an animated sequence having fluid color and texture production and consistency throughout the entire sequence.

It is another object of the present invention to provide a process of creating animated sequences which are not limited to solid color sections, and which contain delicate shading and blending of colors to create strong texture definition.

It is another object of the present invention to provide an animation process which eliminates numerous steps required in the animation process of the prior art yet provides improved texture and color to the resulting animated sequence.

It is a further object of the present invention to provide an animation process in which key frames may be drawn upon a final medium and completely colored thereon prior to digitization into a computer.

It is an additional object of the present invention to provide an animation process in which special effects and lighting may be created when key frames are created.

It is still an additional object of the present invention to provide an animation process which utilizes computer software to create in-between frames from two static key frames containing variable color blends, shading, and texturing such that the exact color and texture variations are produced and maintained from frame to frame.

In accordance with one aspect of the present invention, there is provided an animation producing process which comprises the steps of creating key frames containing objects and characters which correspond to an animated sequence and have substantial color and texture; digitizing the key frames for storage in a predetermined memory space; defining two consecutive key frames as a source and target key frame; outlining corresponding features in said source and target key frame; and generating a plurality of in-between frames that depict a substantially linear interpolation of each outlined feature in the source key frame and a corresponding outlined feature in the target key frame.

The method of the present invention utilizes computer technology to render an animation sequence which preferably uses key frames which are hand drawn and colored directly upon a final medium. The key frames are provided with fully textured and nonsegregated colors in hand drawn key frames. After the key frames are completed, they are then digitized one by one into a computer system using a scanner, photographic image grabber or other digitizing means, and are stored on a storage medium such as a hard drive, floppy disk or CD-ROM. Once stored, the system permits the key frames to be displayed on the computer monitor in side-by-side fashion. The system then performs an outlining during which the boundaries and key features of the character or object are outlined on each key frame. Additional features or those not outlined by the software in the outlining step may be further defined using any computer inputting device, such as a keyboard or digital pen which is capable of writing directly upon the monitor or upon an electronic writing tablet upon which the key frames are visible and which correspond with the key frames visible on the monitor. In response to a control or "join" command, the system then links the two key frames and reveals lines of motion which indicate the paths followed from source key to target key. There must be an adequate number of control lines in order to define the lines of motion. If lines of motion are not defined, motion between any two control lines is assumed linear. A "wireframe" preview may then be run which illustrates a real animation of the control lines and the path they will follow as directed by the lines of motion. Similar to the "pencil test" of the prior art, the "wireframe" preview permits the animator to check timing, layout, and lines of motion over which the control lines will travel.

Any errors or inaccuracies may be easily corrected by modifying or adding more control lines and creating additional lines of motion, or by further defining the outline of the object or character. If the animator is satisfied with the "wireframe" preview, he may proceed and render a low resolution preview. Rendering is the process by which the system calculates and generates the in-between frames based upon the animator's provided information pertaining to control lines, lines of motion, and the number of in-between frames required for source frame to reach the target frame. The number of in-between frames is entered into a field in the program to specify over how many frames the transition should occur, depending upon the playback rate for the media, i.e. film or video, upon which the animation is to be finally stored. The result is actual modified images and not just the control lines as viewed in the "wireframe" preview. If any errors or inaccuracies are found, the animator may make the correction without losing any significant amount of time or money. Once all errors are corrected, a high resolution final print render is performed.

As each rendered frame is completed, it is saved as an image file or appended to one large animation file consisting of many image files ordered sequentially on a temporary or permanent storage medium. If the in-between frames were first saved to a temporary storage medium, they are then output to their final storage medium. In some instances, the rendered frames may be directly output to film or video. From the final medium they may be combined with other footage, such as background or other animation sequences.

The rendered in-between frames depict a substantially linear interpolation of each outlined and defined feature in the source key frame and a corresponding outlined and defined feature in the target key frame, preferably including all details of color and texture. Unlike the animation processes of the prior art, the process of the present invention creates realistically blended colors and flowing texture through the production of all the frames in the sequence.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views.

DETAILED DESCRIPTION OF THE PRESENTLY PREFERRED EMBODIMENT

Figure 1:
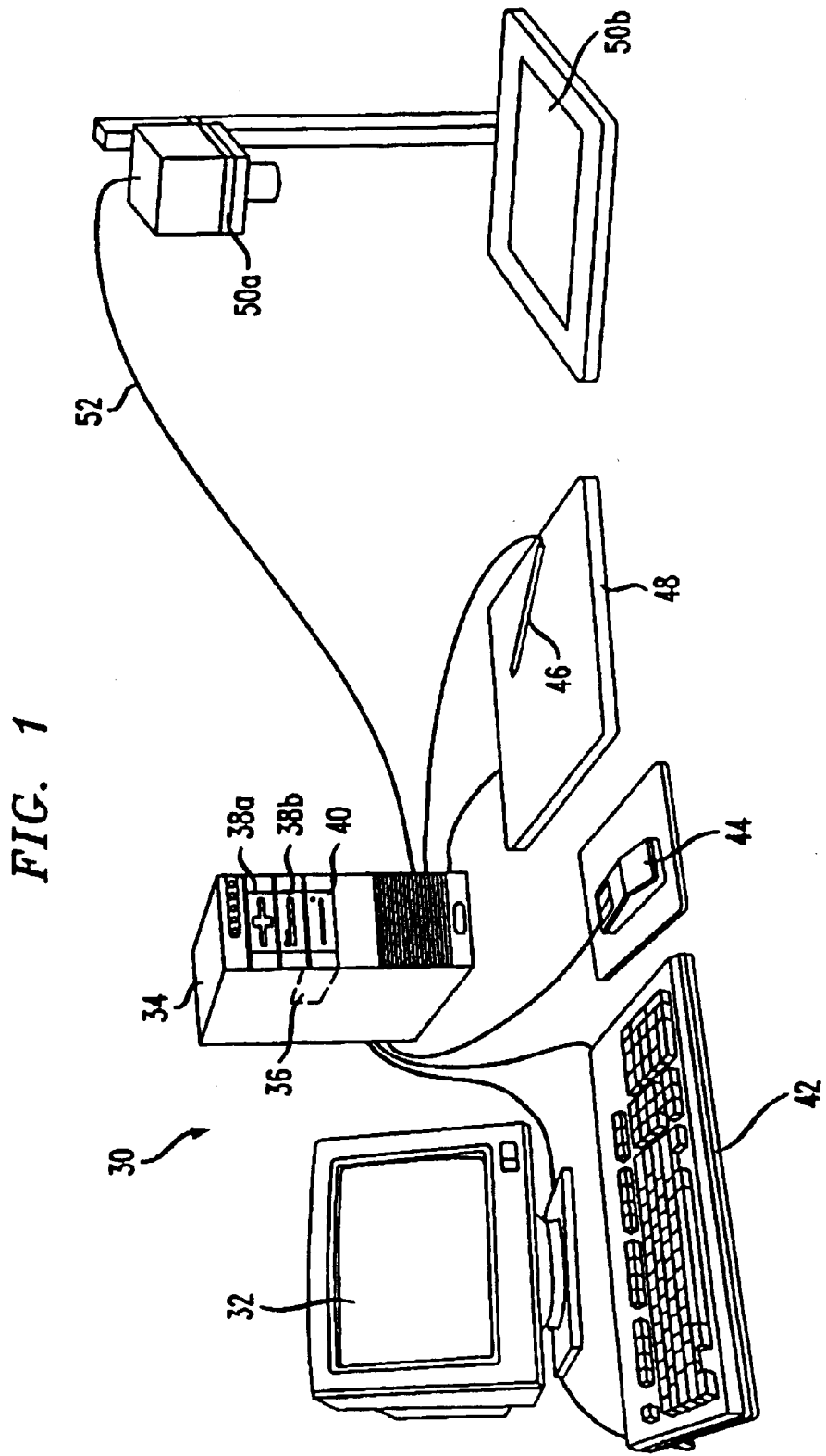
FIG. 1 illustrates a perspective view of the essential equipment utilized in the animation process.

With initial reference to FIG. 1 an exemplary computer system for use in the animation process of the present invention is shown and described. In general, the computer system 30 as illustrated in FIG. 1, comprises a monitor 32, a central processing unit (C.P.U.) 34 which contains internal RAM (random access memory) (not shown) and a hard drive 36 capable of storing digital information thereon. C.P.U. 34 may also comprise one or more floppy disc or tape drives 38a, 38b, and a cd-rom drive 40. Computer system 30 is also comprised of input devices including a keyboard 42, a mouse, 44, and an electronic light pen 46 and associated electronic writing tablet 48. An image grabber and digitizer board 50 or scanner (not shown) is also included as part of computer system 30. Computer system 30 is preferably provided with a graphic imaging software program and a drawing and painting or coloring software program (not shown) loaded onto hard drive 36. Numerous other computer system arrangements may be used and the invention is therefore not limited in this respect.

Figure 2:
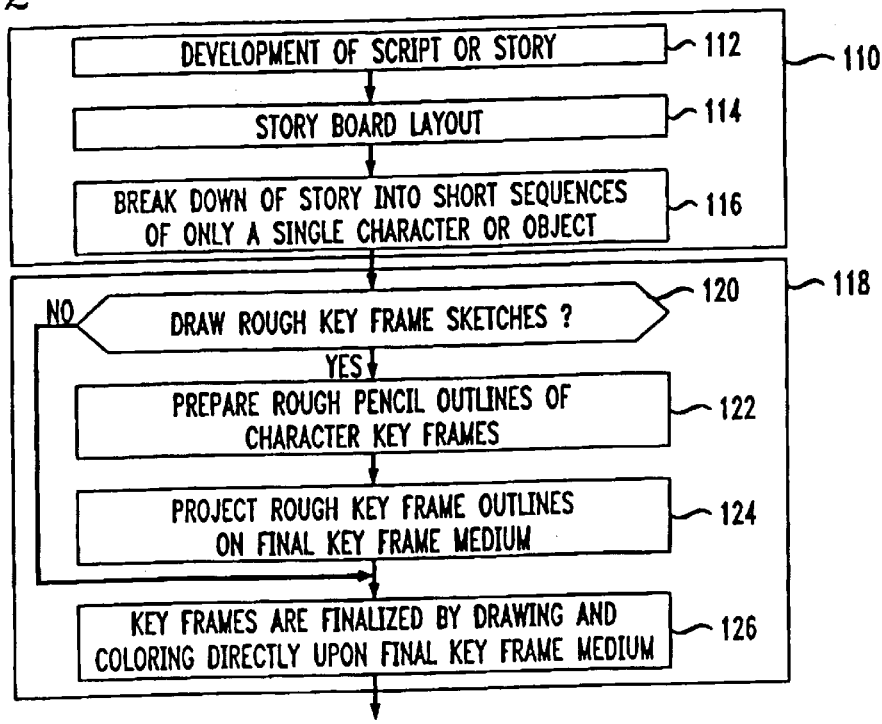
FIG. 2 illustrates a flow chart to which reference will be made in explaining the Layout step and the Key Frame Drawing step as part of one embodiment of the animation process of the present invention.

With reference to FIGS. 1–4, flow charts are illustrated to which reference will be made in describing the animation process of the present invention. FIG. 2 sets forth the steps which are necessary to layout the script or story to be animated. For simplicity, the necessary steps required for the addition of a sound track were omitted. It is understood, however, that a sound track may be added and that the animation process preferably begins at step 110, which generally involves the conception of an idea and the initial development of a script or story. At step 112 a desired script of story that is intended to be animated is provided. At step 114, the idea is converted into a story board layout much like the layout of a comic book page. Since the story may involve more than one character or object, along with a foreground and background, the story board layout developed at step 114 is broken down into short sequences at step 116. Each short sequence contains only a single character or object which will later be composited into the overall fully animated scene. At this point, the animator may make a preliminary estimate of the number of frames which will need to be generated to arrive at the desired length in seconds for each short sequence for later composition into the overall fully animated scene.

The next step in the process involves the preparation of key frame artwork at step 118. Key frames are frames which illustrate extremes of a movement or travel by a character or an object, or movement within a foreground or background. Unlike the prior art which requires converting paper sketches into key frames on translucent cels, followed by independently painting or coloring each translucent cel, the present invention preferably provides for the preparation of key frames directly upon a final medium such as canvas or heavy bond paper. In may cases, the preparation of key frames at step 118 may simply involve drawing and painting the character, object or scene directly upon the canvas or bond paper. Alternatively, rough key frame sketches (an example which is illustrated as 12 in FIG. 6) may first be prepared at step 120 before creating the final key frames 14.

Figure 6:
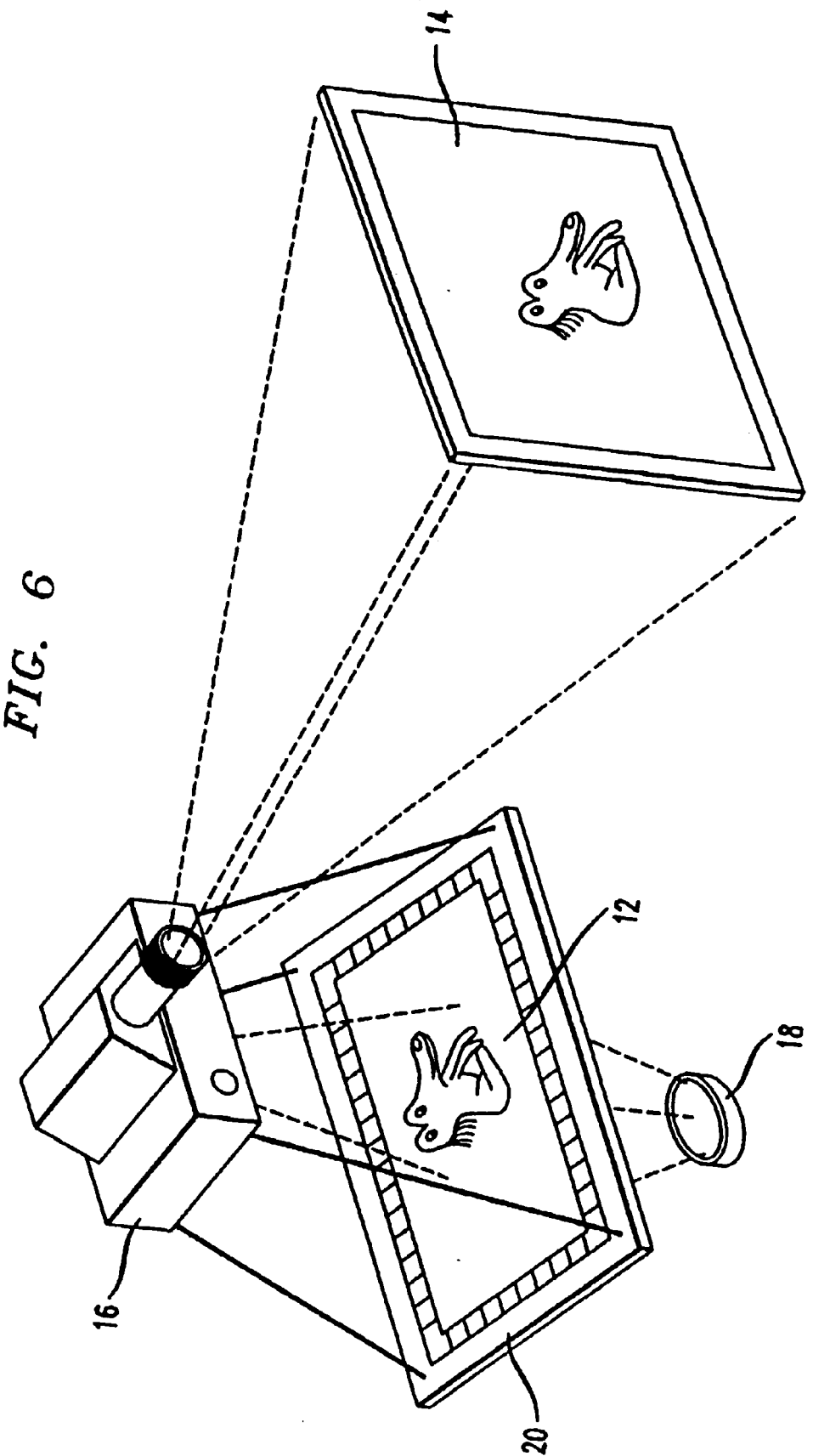
FIG. 6 illustrates a perspective view of the projection of a rough key sketch upon a final key frame medium.

As illustrated in FIG. 6, one or more rough key frame sketches 12 are generally prepared using pencil or ink and which depict extreme or key positions of the character or object. The preparation of rough key frame sketches 12 is sometimes more comfortable for the animator to prepare, especially when dealing with very large final key frame sizes. Additionally, rough key frame sketches 12 illustrate the size, shape and position, of the character, object, or scene, and provides the animator with a guide for coloring. By creating rough key frame sketches 12 and projecting them on to the final medium 14, the animator is afforded the opportunity to create sketches on inexpensive ordinary paper before transferring the character or object to what is generally a larger and more expensive medium, e.g. canvas. Using a projector 16, and a light source 18 disposed under a translucent surface 20, as illustrated in FIG. 6, the rough key sketch 12 is projected upon the final key frame medium 14 where it is traced thereon at step 124. The invention is not, however, limited in this respect, and the task of transferring rough key sketches to the final key frame medium may be implemented using any other apparatus which accomplishes the task. Projecting the rough key sketches onto the final key frame medium aids the animator in drawing the character or object with the correct proportions, pose, and scale among other things.

After the rough key frame sketch 12 has been transferred to the final key frame medium 14, paint is applied directly to the final key frame medium 14 at step 126. Oil, acrylic, pastels, colored marker, or other base paint or ink medium which are used in traditional, non-animated works can be used on the final key frame medium to create the desired feeling and visual effect. The painter or colorist should be careful to keep close to the perimeter lines. The painter/colorist is not, however, limited to a pre-defined number of colors or a single paint type. Furthermore, the painter/colorist may apply shading techniques, texturing and variable color blending. A finished key frame generally resembles a painting, not unlike those seen in art museums, and does not resemble a traditional animated cel. Although details and color blends are more clearly visible when key frames are hand drawn, key frames may alternatively be created entirely on a computer using a drawing and painting software program. It is to be noted that the key frames may be prepared manually as set forth in steps 110–126, or they may be prepared directly within computer system 30 using a graphic imaging software program.

Figure 3:
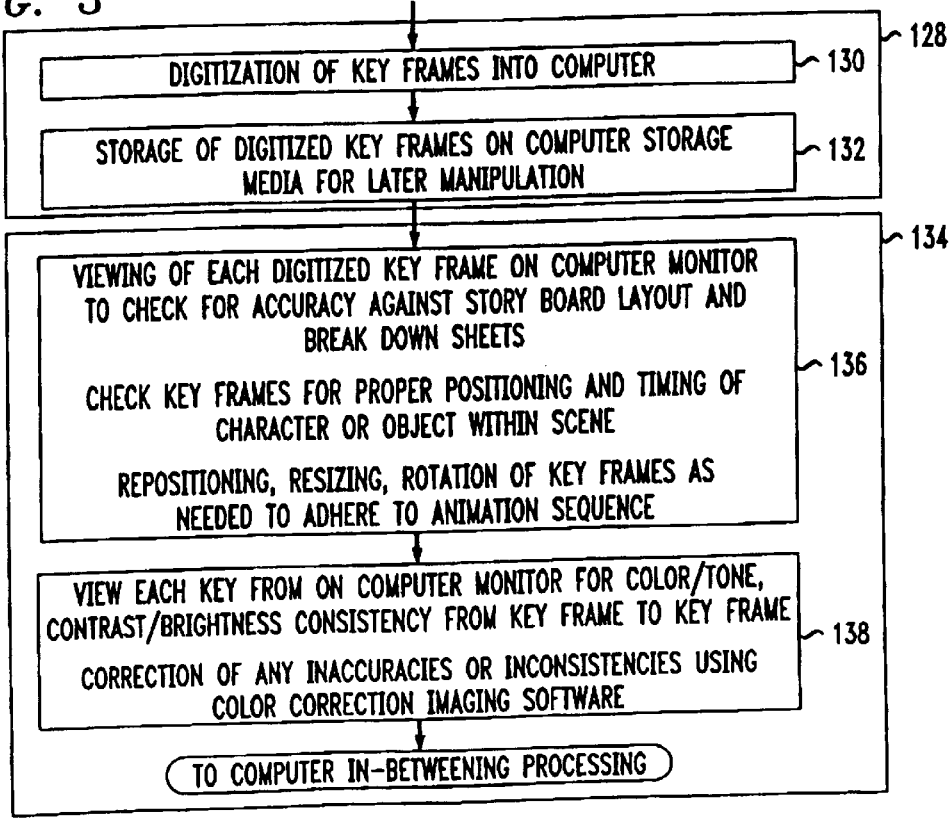
FIG. 3 illustrates a flow chart to which reference will be made in explaining the Key Frame Input step and the Key Frame Computer Pre-Processing step as part of one embodiment of the animation process of the present invention.

Referring now to FIG. 3, at step 128, the final drawn key frames are digitized into computer system 30. Before commencing actual digitization, each key frame is checked for accuracy and visual completeness. Minor corrections or adjustments may simply be added upon the key frame. Upon approval of the final key frames, they are imported or digitized into computer system 30 at step 130. Note, however, that if the key frames were prepared using a software program on a computer system 30, digitization step 128 is skipped.

Digitization involves electronically converting the key frames into computer system 30 at step 130 and storing the digitized key frames on computer storage media at step 132. The digitization of key frames at step 130 is generally accomplished by photographing the key frames using image grabber 50a and digitizer board 50b (shown in FIG. 1) or using a scanner (not shown). The video image output of image grabber 50a is fed through a cable 52 into a frame grabber card (not shown) attached to the C.P.U. 34. The software provided with the image grabber 50, frame grabber card or scanner, then allows for the frame to be captured and viewed on monitor 32. "Capturing" consists of reading the image input from the frame grabber card and temporarily storing it in RAM (not shown) within the C.P.U. 34 at step 132. Once the image is in the system's RAM in its entirety, the image may be written to a nonvolatile storage medium such as hard drive 36, floppy or tape drives 38a, 38b, or a CD in CD-ROM drive 40.

After storing is completed, key frame computer pre-processing commences at step 134. Pre-processing involves arranging the frames in proper sequential order and viewing each digitized key frame individually at step 136 on the computer monitor 32. Key frames are examined against the story board layout which was prepared at step 114 and break down sheets which were generated at step 116 (shown in FIG. 2) for accuracy in positioning, and timing of the character or object within the overall scene. Each frame may optionally be overlaid over background scenery or composited with other characters to check positioning and timing. Furthermore, each elemental region or "pixel" in a video frame has a stored value or values (referred to as the "video content value" or "pixel value") associated with it. The stored value is typically an n-bit word that represents video content, e.g by bits which represent luminance or chrominance, or which represent color values for red, green and blue.

At step 138, each key frame is preferably viewed and compared on monitor 32 in side-by-side arrangement with all other key frames to ascertain proper color, hue, tone, contrast and brightness consistency from key frame to key frame and to assure that all the digitized key frames in a sequence will match up in colors and contrast. This step produces the feeling and atmosphere of each key and prevents flickering produced by inconsistent colors in the final animation. Computer system 30 also permits repositioning, resizing, and rotation of the key frames via software, as needed. Using color imaging or painting software, any inaccuracies, or inconsistencies in the colors are easily corrected. There are many commercially available graphic imaging, coloring and processing software packages, such as most graphic and paint programs, that may be employed to process step 138.

Figure 4:
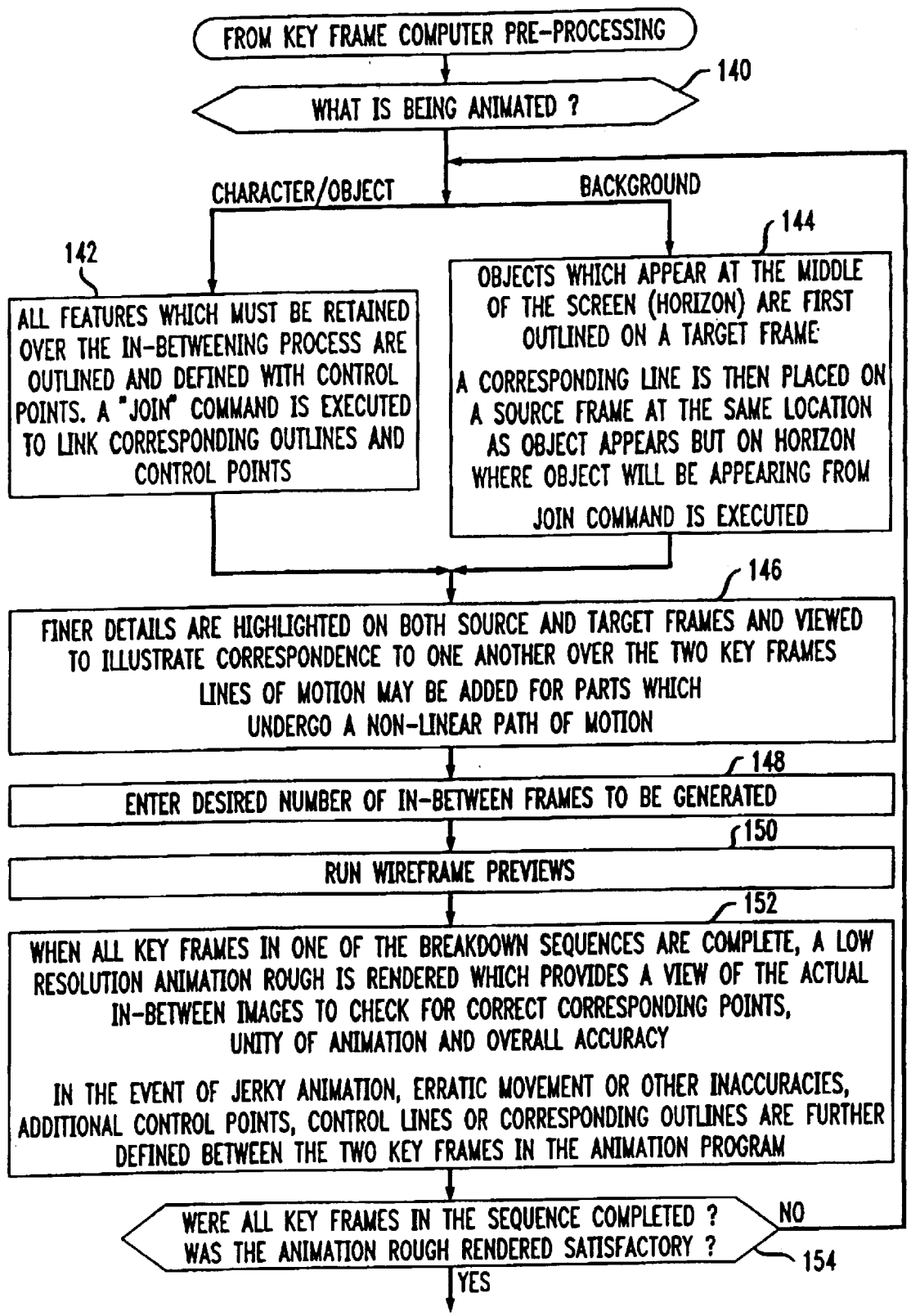
FIG. 4 illustrates a flow chart to which reference will be made in explaining the Computer In-Betweening step as part of one embodiment of the animation process of the present invention.
Figure 5:
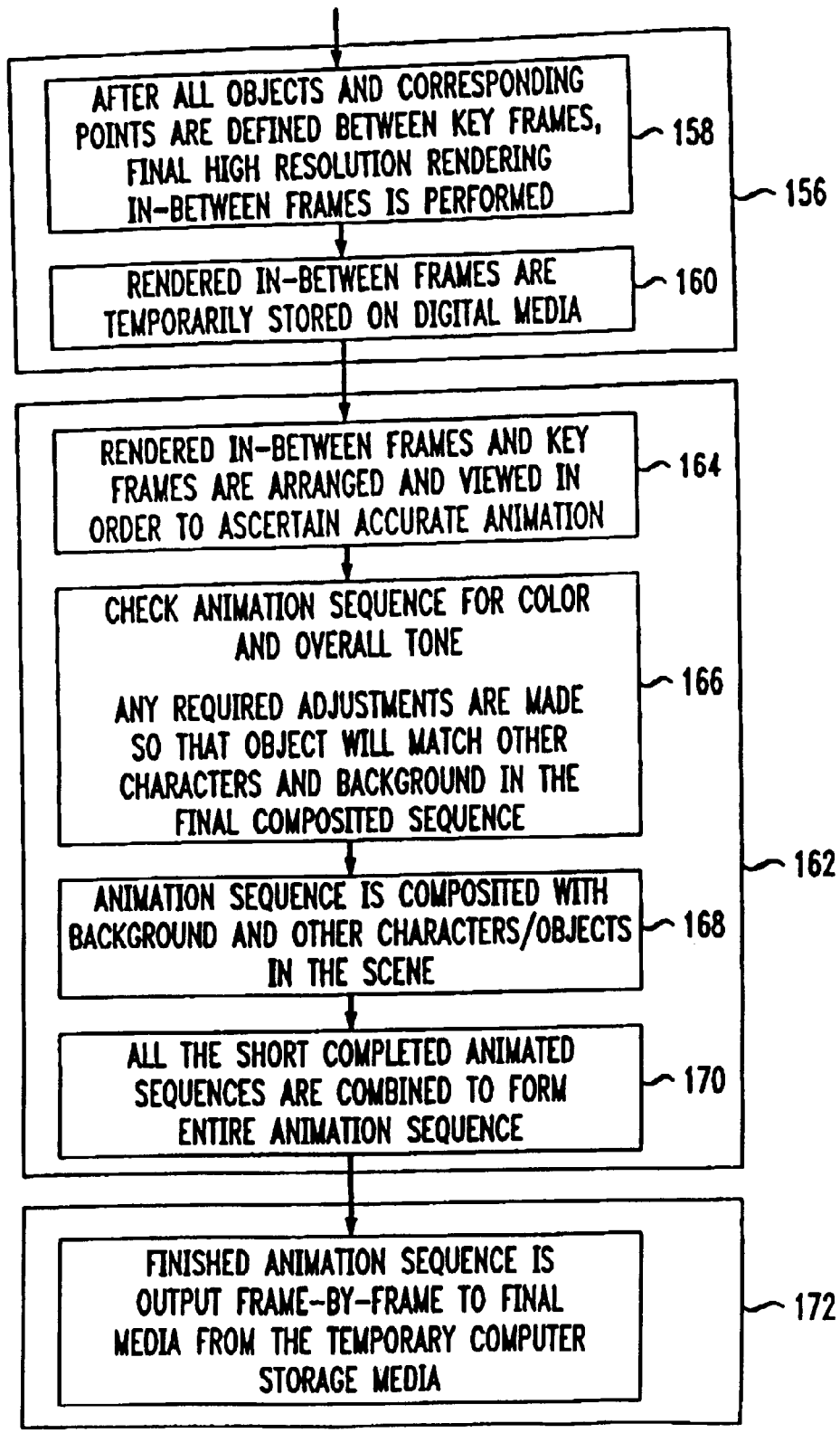
FIG. 5 illustrates a flow chart to which reference will be made in explaining the Final In-Between Frame Rendering step and the Final Processing and Compositing step of part of the animation process of the present invention.
Figure 7:
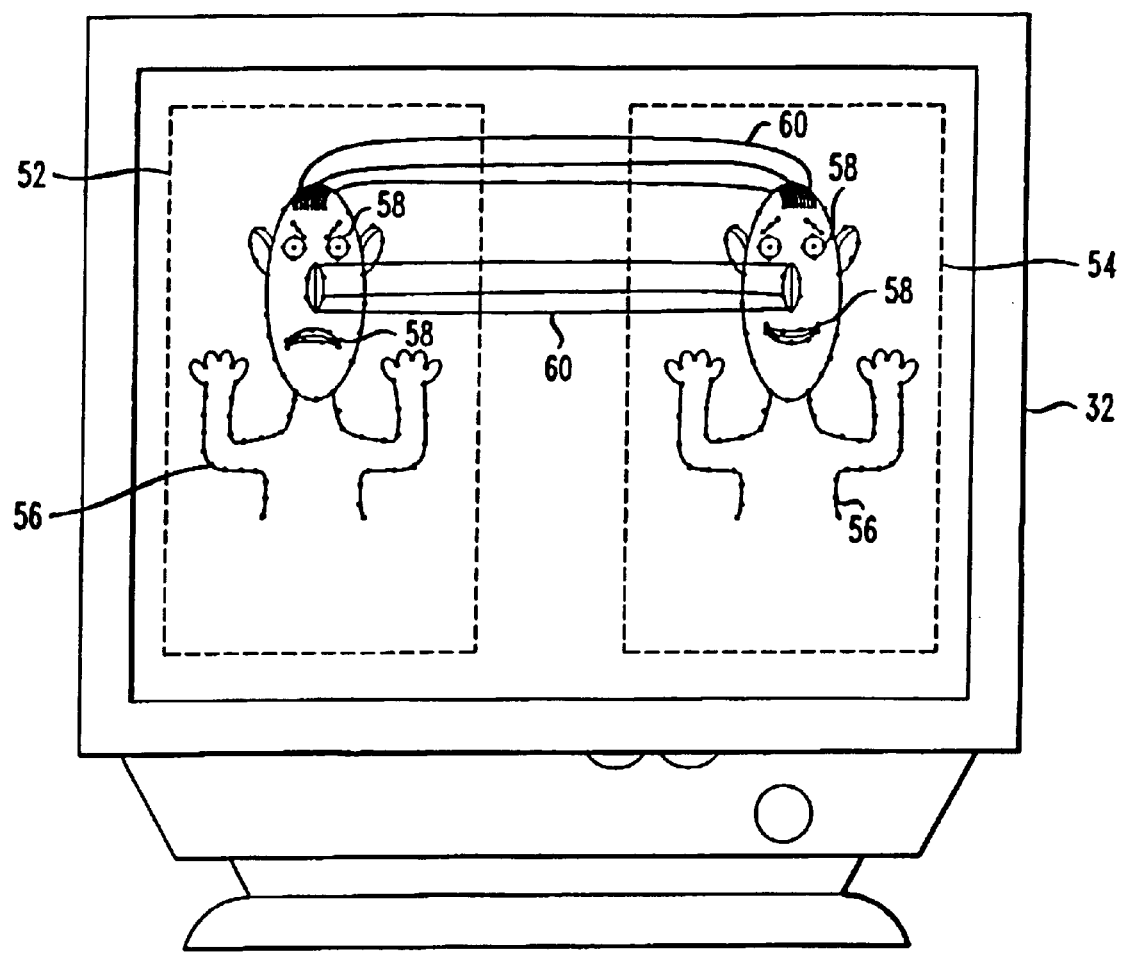
FIG. 7 illustrates an exemplary source and target key frame in arranged side-by-side on a computer monitor and illustrating outlines, control points and control lines of the facial features and upper torso of a character.

The next step in the animation process involves computer in-betweening object definition, the steps of which are generally set forth in FIG. 4. Before commencing computer in-betweening object definition, a determination must be made as to what is being animated at decision step 140. If a character or object is being animated, the computer system 30 proceeds to step 142 and queries the animator to define a basic outline of the character or object's body on a first key frame which is viewable on computer monitor 32, and which is referred to as the source key frame 52 and is illustrated in FIG. 7. Thereafter, as further illustrated in FIG. 7, the animator outlines the character or object's body on a second key frame viewable on computer monitor 32, and referred to as the target frame 54 and which defines the corresponding position of the character or object as it appears in the source frame 52. This outlining of the character or object's body on source frame 52 and target frame 54 allows the software in computer system 30 to determine which pixels correspond from key frame to key frame.

Outlining is performed using graphic imaging software loaded on hard drive 36 of computer system 30, and which is capable of projecting two key frames in side-by-side relationship on computer monitor 32 so that shapes and features of the characters, objects or effects are correspondingly outlined in both key frames. Outlining involves the step of associating numerous individual pixels within the video frames on computer monitor 32, with control lines 56 that define points and vectors. Each pixel has a stored value which facilitates the ability to accurately outline or highlight precise areas on a video frame and to correspondingly highlight the exact same pixel on the corresponding video frame projected at its side on computer monitor 32. In the case of a character animation, all main features must be outlined with numerous control lines 56, or they will distort and blur over the generated in-between frames. For instance, if a character's face is to be animated, the head, eyes, nose, mouth, ears, hair, etc. must all be outlined. As shown in FIG. 7, the features which are outlined are those which are to be retained over the in-betweening process, such as the body outline and facial features. In addition to the control lines 56 generated by the computer system 30 in outlining step 142, additional features may be defined, and further definition of the previously outlined features may be added using numerous individual control points 58, and by adding supplemental control lines 56 upon the character or object illustrated in the source key frame 52 and target key frame 54 on video monitor 32. Control points 58 and supplemental control lines 56 are easily added by manipulating the graphic imaging software on computer system 30. An example of a commercially available graphic imaging software that could be used is the program entitled "Elastic Reality", which is manufactured ASDG.

If the animator's graphic imaging software does not contain an outlining feature, the animator manually places multiple corresponding control lines 56 and control points 58 along character or object boundaries and features in both source and target key frames 52, 54, respectively, which correspond to one another, i.e. the mouth of a character in the source and target key frames would be outlined and linked to show the specific shape of the transformation over the animation. Electronic light pen 46 (shown in FIG. 1) may be used to draw control lines 56 and add control points 58 to key frames 52, 54, by drawing directly upon monitor 32 or upon an electronic writing tablet 44 (shown in FIG. 1). When touched to a source or target key frame projected upon computer monitor 32 or writing table 44, light pen 46 causes the software program to associate the underlying pixel or pixels in the video frame with areas defined as outlines 56.

In the case of an effect or background animation, objects which appear at the middle of the frame on the horizon are first outlined on a target frame at step 144. A corresponding line is then placed on a source frame at the location on the horizon where it will be appearing from. For an effect, such as a waterfall, there must be horizontal corresponding lines which progressively correspond downward. Random, vertically drawn horizontally downward lines may also be added to add grain and definition to the flowing water. Additionally, the overall shape of the waterfall must be outlined.

After key features have been outlined as necessary in steps 142 and 144 using control lines 56 and control points 58, a "join" command is then executed wherein the corresponding control lines 56 and control points 58 of each key frame are linked together to illustrate correspondence between the source frame 52 and target frame 54. As previously mentioned the "join" command links the source and target flames wherein lines of motion 60 are generated and revealed on computer monitor 32, as illustrated in FIG. 7. Lines of motion 60 indicate the exact paths the control lines 56 and control points 58 will follow along a given arc in a transformation from source frame 52 to target frame 54. This joining step is repeated for every major part or feature in source key frame 52 which is going to follow a distinct path of animation to target key frame 54.

At step 146, the animator views on monitor 32 the changes which occurred in the transformation from source key frame 52 to target key frame 54. If a specific part is not defined, it may lose its definite shape and clarity, and appear as a blur of color. Smaller or more precise control lines within larger sections must therefore be defined to show fine details and definite parts or sections. Furthermore, it is desirable to add additional control lines to obtain greater definition of textures, finer shapes and overall clarity over the two key frames.

Once all control lines 56 and control points 58 have been adequately defined and lines of motion 60 have been generated for many parts after execution of the "join" command in step 142, 144, additional lines of motion 60 may be added at step 146. These additional lines of motion 60 are generally added for any part that does not have only a linear path of motion. Thus, if lines of motion 60 are not defined between corresponding control lines 56 or control points 58 in the source key frame 52 and target key frame 54 (shown in FIG. 7), the motion between any two corresponding control lines 56 and/or control points 58 is assumed linear. After all the basic control lines 65, control points 58 and necessary lines of motion 60 are finally defined, the number of in-between frames required for source key frame 52 to reach target key frame 54 is entered into computer system 30 at step 150 to specify the number of frames which should be generated in the transition from source key frame 52 to target key frame 54. The number of in-between frames generated is dependent upon whether the animation is destined for film which has a playback rate of 24 frames per second, or video which has a playback rate of 30 frames per second. It should be noted that there are many other controls and parameters that can be adjusted to fine tune the animation process but have not been discussed herein and the invention is therefore not limited in this respect.

After the in-between frames have been generated, a number of "wireframe" previews are performed at step 152 to ascertain proper placement and transition of the control lines from one frame to the next. The "wireframe" preview is basically a "real time" animation of control lines 60 and the path they will follow as controlled by the lines of motion. The "wireframe" previews offer an opportunity to check the timing, layout, and motion over which the defined control lines are to follow as they are directed by the defined lines of motion. Any errors or inconsistencies may be corrected by adding, removing, and/or modifying a control line or line of motion in the key frames. After making corrections or modification, another "wireframe" preview may be performed to view the corrections.

If the animator is satisfied with the "wireframe" preview (s), he may proceed in rendering a low resolution animation rough at step 152. "Rendering" is the process by which the computer calculates the in-between frames based on the information provided by the animator using the computer system 30. The low resolution rough provides a view of the actual in-between images and not just the control lines 60 as seen in the "wireframe" previews. The low resolution rough is considerably faster in rendering than a high resolution final print, though not as fast as a "wireframe" preview, and is thought of as a rough draft copy for spotting major flaws in the positioning of the control points 58, control lines 60, lines of motion, as well as timing and positioning errors which cannot be seen in the "wireframe" preview. Playback of the low resolution rough may normally be accomplished by playing the sequence of low resolution in-between frames and key frames in real time, or nearly real time, on computer monitor 34 directly off of the temporary storage medium to which they are stored. The animation rough may also be overlaid on a background scenery as an additional check for errors.

After rendering the low resolution rough at step 152 and after correcting any errors or inaccuracies, a determination must be made at decision step 154 as to whether the low resolution rough was satisfactory and whether all the key frames in the sequence are complete. If any errors or erratic or non-natural movements are evident, the animator may revert to the step where the error was made and correct it. For instance, if jerky animation is viewed during the low resolution rough, the animator may return to the step of defining the key features at step 142 and 144 and subsequent step 146 to highlight finer details on both the source and target key frames. Additionally, if the character suddenly floated or twisted out of its natural, planned line of motion, the animator would correct this by returning to the repositioning steps at 136 and 138.

If the animation rough was satisfactory, final in-between frame rendering steps commence at step 156. The final rendering of in-between frames which is performed at step 158 is a high resolution rendering. As each in-between frame is rendered it is usually saved on a temporary storage medium at step 160 such as an image file or appended to one large animation file consisting of may image files. The images are preferably saved in sequential order for easy identification and recall. The entire animation process to this point, steps 110–160, are repeated numerous times for each character, subject object, background, foreground and scenery which is to appear in the completed animation sequence.

In the final processing and compositing at step 162, the rendered in-between frames and key frames are viewed at step 164 on the temporary storage medium to ascertain accurate animation. During this viewing the animation sequence is checked at step 166 for color and overall tone consistency. If the animator is satisfied with color and tone consistency, the animation sequence is composited at step 168 with the background, foreground or other characters in the scene 166. The result is an animated character or object which has the shading, texturing and color variations consistent through the entire sequence, and which produces realistic and fluid moving textures. All the short completed animated sequences are then combined at step 170 to form an entire animated sequence or story. The completed animation sequence is then output frame-by-frame at step 172 from the temporary storage media on which it resides to a final storage medium such as film, tape or interactive cd. Further editing or the addition of special effects, voice, music and other sounds may be thereafter be accomplished in the computer based operating system.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

I claim:

1. An animation producing process comprising the steps of:
   (a) creating key frames containing objects and characters corresponding to an animated sequence, said objects and characters having substantial color and texture;
   (b) digitizing said key frames including information corresponding to said color and texture for storage in a predetermined memory space;
   (c) defining two consecutive key frames as a source and target key frames;
   (d) outlining corresponding features in said source and target key frames; and
   (e) generating a plurality of in-between frames that depict a substantially linear interpolation of said color and texture information and each of said outlined features in said source key frame and a corresponding color and texture information and an outlined feature in said target key frame.

2. The method in accordance with claim 1, further comprising the steps of repeating said steps (c) through (e) so that a predetermined animated sequence length is generated.

3. The method in accordance with claim 1, further comprising the steps of storing said plurality of in-between frames for later reproduction.

4. The method in accordance with claim 1, wherein said step of creating key frames is performed manually.

5. The method in accordance with claim 1, wherein said step of creating key frames is performed via a computer system having a graphic imaging system loaded therein.

6. The method in accordance with claim 1, wherein said step of creating key frames further comprises the step of drawing said key frames upon a final medium.

7. The method in accordance with claim 1, wherein said step of creating key frames further comprises the step of creating a rough key frame and projecting said rough key frame upon a final medium.

8. The method in accordance with claim 1, wherein said step of creating key frames provides key frames in which said substantial color and texture is non-segregated.

9. The method in accordance with claim 1, wherein said step of outlining features further comprises the steps of positioning vectors, points and lines on said corresponding features.

10. The method in accordance with claim 9, wherein said step of outlining features is effected by manipulating a graphical imaging software program.

11. The method in accordance with claim 9, wherein said step of generating in-between frames further comprises the step of overlaying said target frame over said key frame, and defining lines of motion depicting the path of said vectors, points and lines along a given arc.

12. The method in accordance with claim 9, wherein said step of generating a plurality of in-between frames further comprises the step of specifying the necessary number of said in-between frames.

13. The method in accordance with claim 9, wherein said animation sequence corresponds to a moving image of a background scene, said method further comprising the step of defining an outline of a background object represented by a line on said source key frame and defining a substantially complete shape of said background object on said target key frame.

14. The method in accordance with claim 9, wherein said animation sequence corresponds to a moving image of a background scene, said method further comprising the step of defining an outline of a background object represented by a point on said source key frame and defining a substantially complete shape of said background object on said target key frame.

15. The method in accordance with claim 1, further comprising the step of previewing said source and target frame prior to said step of generating said plurality of in-between frames.

\* \* \* \* \*